United States Patent
Bazzo

(10) Patent No.: US 9,102,085 B2
(45) Date of Patent: Aug. 11, 2015

(54) APPARATUS FOR INJECTION-MOULDING OF PLASTIC MATERIALS

(71) Applicant: INGLASS S.p.A., San Polo di Piave (Treviso) (IT)

(72) Inventor: Maurizio Bazzo, San Polo di Piave (IT)

(73) Assignee: INGLASS S.P.A., San Polo di Piave (Treviso) (IT)

( * ) Notice: Subject to any disclaimer, the term of this patent is extended or adjusted under 35 U.S.C. 154(b) by 217 days.

(21) Appl. No.: 13/928,944

(22) Filed: Jun. 27, 2013

(65) Prior Publication Data

US 2014/0037781 A1    Feb. 6, 2014

(30) Foreign Application Priority Data

Jun. 28, 2012   (IT) .............. TO2012A0578

(51) Int. Cl.
  *B29C 45/23*   (2006.01)
  *B29C 45/07*   (2006.01)
  *B29C 45/28*   (2006.01)
  *B29C 45/20*   (2006.01)

(52) U.S. Cl.
  CPC .............. *B29C 45/07* (2013.01); *B29C 45/281* (2013.01); *B29C 45/20* (2013.01); *B29C 45/23* (2013.01); *B29C 45/2806* (2013.01); *B29C 2045/282* (2013.01); *B29C 2045/2824* (2013.01); *B29C 2045/2834* (2013.01)

(58) Field of Classification Search
  CPC ...... B29C 45/2806; B29C 45/23; B29C 45/20
  USPC .......................... 425/562, 563, 564, 565, 566
  See application file for complete search history.

(56) References Cited

U.S. PATENT DOCUMENTS

| 2,773,284 | A |   | 12/1956 | Kelly |
|-----------|---|---|---------|-------|
| 3,371,384 | A | * | 3/1968  | Nouel ............................ 425/146 |
| 3,488,810 | A |   | 1/1970  | Gellert |
| 3,530,539 | A |   | 9/1970  | Gellert |
| 4,712,995 | A | * | 12/1987 | Basnett ........................ 425/562 |
| 4,787,840 | A | * | 11/1988 | Gellert ......................... 425/549 |
| 5,948,450 | A |   | 9/1999  | Swenson et al. |
| 7,121,820 | B2| * | 10/2006 | Tooman et al. .............. 425/145 |
| 7,234,929 | B2| * | 6/2007  | Vasapoli et al. ............. 425/145 |
| 7,553,150 | B2| * | 6/2009  | Kaushal et al. .............. 425/564 |

(Continued)

FOREIGN PATENT DOCUMENTS

| DE | 198 57 735 | 6/2000 |
|----|------------|--------|
| DE | 199 56 215 | 6/2001 |

(Continued)

OTHER PUBLICATIONS

Search Report for IT TO2012A000578 dated Mar. 26, 2013.

(Continued)

*Primary Examiner* — Tim Heitbrink
(74) *Attorney, Agent, or Firm* — Nixon & Vanderhye P.C.

(57) ABSTRACT

Apparatus for injection-moulding of plastic materials comprising a hot runner (1), at least one injector (2) including a nozzle mobile within which is a valve pin (3) driven by a rotary electric motor (4) and an associated transmission including a screw-and-nut assembly (10) for converting the rotation of the shaft (5) of the electric motor (4) into a translation of the valve pin (3). At least the rotary electric motor (4), and the screw-and-nut assembly (10) are set parallel alongside one another.

23 Claims, 15 Drawing Sheets

(56) References Cited

U.S. PATENT DOCUMENTS

2008/0014296 A1    1/2008   Tooman et al.
2010/0285170 A1*  11/2010   Galati et al. .................. 425/562
2014/0327173 A1*  11/2014   Jenko et al. .................. 264/161

FOREIGN PATENT DOCUMENTS

| DE | 10 2008 029 216 | 12/2008 |
|----|-----------------|---------|
| EP | 2 008 790 | 12/2008 |
| EP | 2 008 790 A2 | 12/2008 |
| JP | 6-114887 | 4/1994 |
| WO | WO 2010/126330 A2 | 4/2010 |
| WO | WO 2010/126330 | 11/2010 |
| WO | WO 2010/126330 A3 | 11/2010 |

OTHER PUBLICATIONS

European Search Report dated Oct. 24, 2013.

* cited by examiner

APPARATUS FOR INJECTION-MOULDING OF PLASTIC MATERIALS

This application claims priority to IT TO2012A000578 filed 28 Jun. 2012, the entire contents of which is hereby incorporated by reference.

FIELD OF THE INVENTION

The present invention relates to apparatuses for injection-moulding of plastic materials comprising a hot runner, at least one injector that includes a nozzle within which a valve pin is axially movable, and actuator means for governing axial displacement of the valve pin between a closing position and an opening position to enable flow of fluid plastic material under pressure from the hot runner into a mould cavity.

More in particular, the invention regards a moulding apparatus of the above sort, in which the actuator means that govern axial displacement of the valve pin consist of an electric motor.

PRIOR ART

The use of an electric motor for governing the valve pin of the injector presents, as compared to conventional systems that use for this function (hydraulic or pneumatic) fluid actuators, the advantage of enabling a continuous and hence more accurate and precise control of the position of the open/close element and, consequently, of the flow of the fluid plastic material from the hot runner into the cavity of the mould.

Known from the U.S. Pat. No. 7,214,048 is an injection-moulding apparatus of the type defined above in which directly associated to each injector is a linear electric motor set coaxially to the valve pin, above the hot runner.

The Japanese patent application No. JP-A-6114887 and the U.S. Pat. No. 7,121,820 describe solutions in which the electric motor, also in this case set above the hot runner coaxial to the injector, is a rotary motor and actuates the valve pin through a screw-and-nut assembly transmission.

All these solutions entail the drawback of presenting a considerable encumbrance in the vertical direction that results in an increase in height of the moulding apparatus as a whole.

Likewise known from the U.S. Pat. No. 6,294,122 is an injection-moulding apparatus of the aforesaid type, in which the rotary electric motor that actuates the valve pin of each injector, also in this case through a screw-and-nut transmission, is also set coaxial to the injector above the hot runner. In one solution, represented in FIGS. 6-8, the electric motor is set with its axis oriented perpendicular to the axis of the injector and governs, via a pair of bevel gears, the screw-and-nut transmission that actuates the valve pin. Since the screw-and-nut transmission is also set coaxially above the valve pin, also in this case the arrangement of the electric motor and of the corresponding transmission leads to a considerable encumbrance upwards above the hot runner.

SUMMARY OF THE INVENTION

The object of the present invention is to overcome the drawbacks referred to above, and more in particular to provide an apparatus for injection-moulding of plastic materials of the type defined above, the vertical encumbrance of which may be contained substantially within the height of the hot runner, or in any case will be appreciably reduced.

With a view to achieving the above object, the subject of the invention is an apparatus for injection-moulding of plastic materials as defined in the preamble of Claim 1, the primary characteristic of which lies in the fact that at least two from among said valve pin, said rotary electric motor, and said screw-and-nut assembly are set parallel alongside one another.

Thanks to this arrangement, since the injector typically projects underneath the hot runner, also the electric motor and the screw-and-nut assembly can be substantially kept within the vertical encumbrance thereof. But also in the case where the motor and possible components of the transmission are, instead, set at the top, the overall dimensions are in any case limited.

The valve pin defines a first axis, the shaft of the electric motor defines a second axis, and the screw-and-nut assembly defines a third axis. The invention envisages multiple different embodiments in which the second and third axes are parallel to one another and to the first axis, and in this case the first and third axes may even coincide, or else embodiments in which the second and third axes are parallel to one another and orthogonal to the first axis, or yet again embodiments in which the first and third axes are parallel to one another and orthogonal to the second axis.

According to a further characteristic of the invention, the transmission that converts the rotation of the shaft of the rotary electric motor into a translation of the valve pin conveniently comprises force-multiplier means set between the shaft of the electric motor and the screw of the screw-and-nut assembly, and may also include further force-multiplier means set between the screw-and-nut assembly and the valve pin.

The electric motor and the screw-and-nut assembly may be conveniently housed within a common supporting casing that may be fixed to the hot runner in different angular positions that can be selected, according to the need, about the axis of the valve pin.

Control of the electric motor may be obtained in a conventional way with the aid of a linear-position or angular-position transducer operatively associated to the valve pin, or else to the screw-and-nut assembly, or to any other component of the transmission, operatively connected to an electronic circuit for closed-loop control of the electric motor.

According to another aspect of the invention, a circuit is provided for forced cooling of the electric motor as well as, jointly or separately, of the screw-and-nut assembly, to which there may be associated a flow-rate sensor and/or a temperature sensor designed to interrupt automatically electrical supply of the hot runner in the case of emergency. This prevents the risk of overheating of the mechanical and electro-mechanical members (transmission, electric motor), which have to operate at temperatures that are not too far above ambient temperature and in any case much lower than those of the hot runner.

BRIEF DESCRIPTION OF THE DRAWINGS

The invention will now be described in detail with reference to the annexed drawings, which are provided purely by way of non-limiting example and in which.

DETAILED DESCRIPTION OF THE INVENTION

With initial reference to FIGS. 1 to 4, designated by 1 is a portion of hot runner of an apparatus for injection-moulding of plastic materials, through which the fluid plastic material is fed to an injector 2 that extends downwards from the hot runner 1 and co-operates, in a way in itself known, with the gate of a mould (not illustrated).

Figure 1:
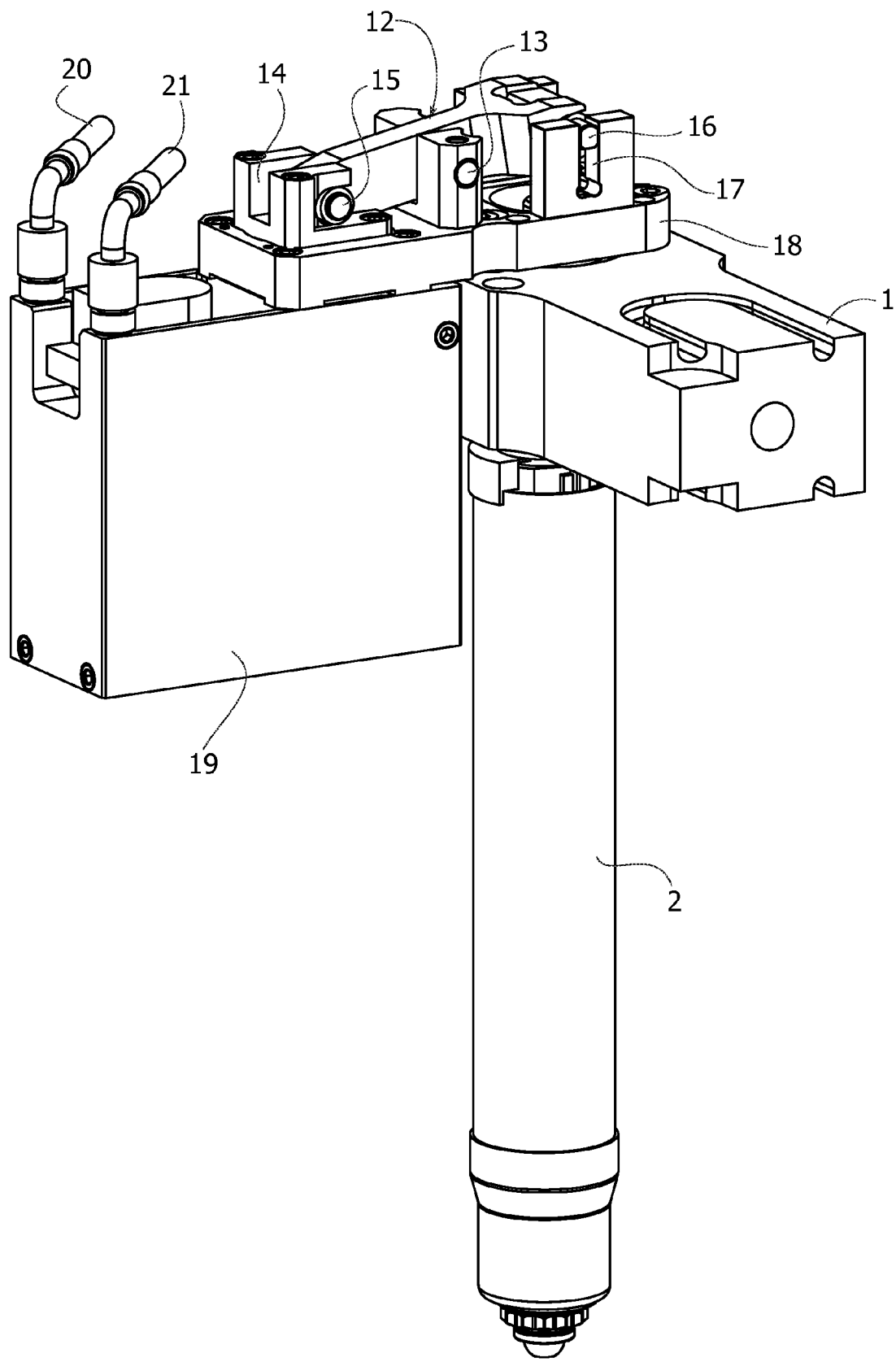
FIG. 1 is a schematic perspective view of a part of an apparatus for injection-moulding of plastic materials according to a first embodiment of the invention.
Figure 2:
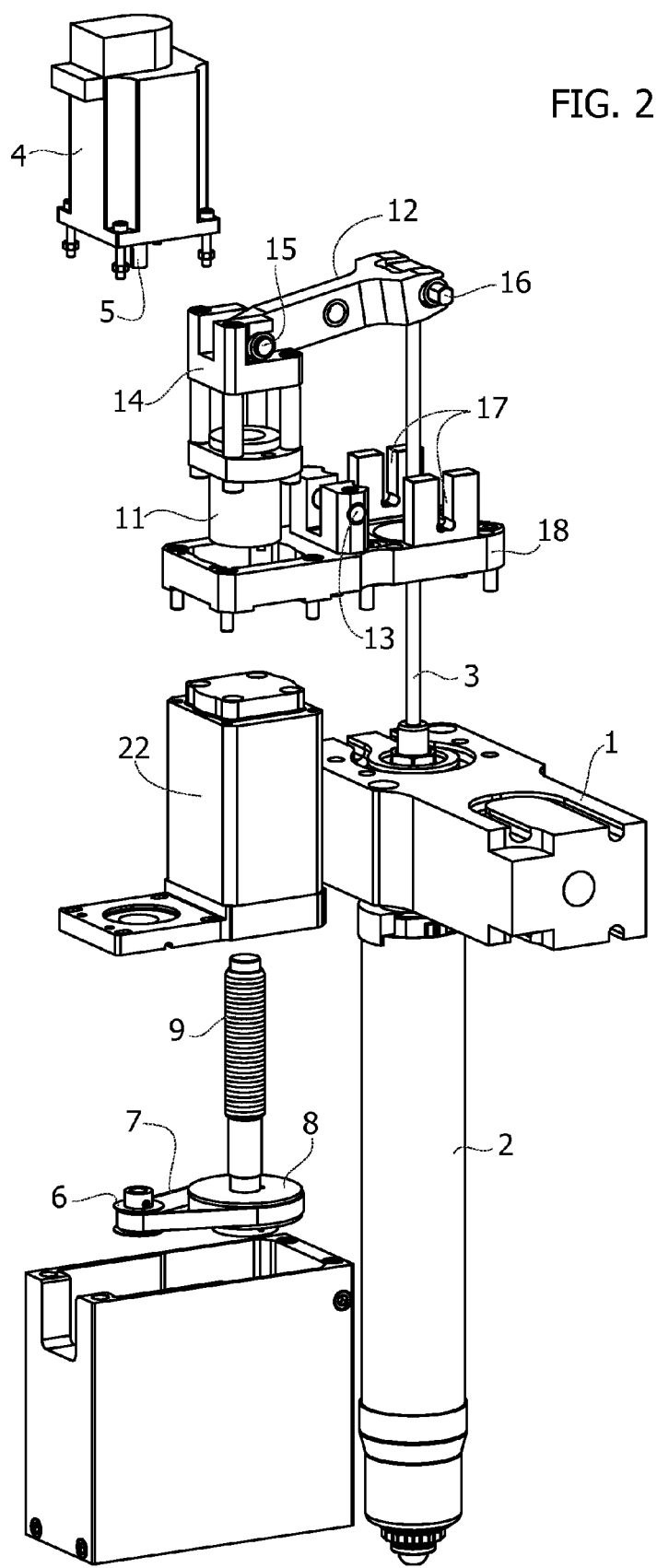
FIG. 2 is an exploded view of FIG. 1.
Figure 3:
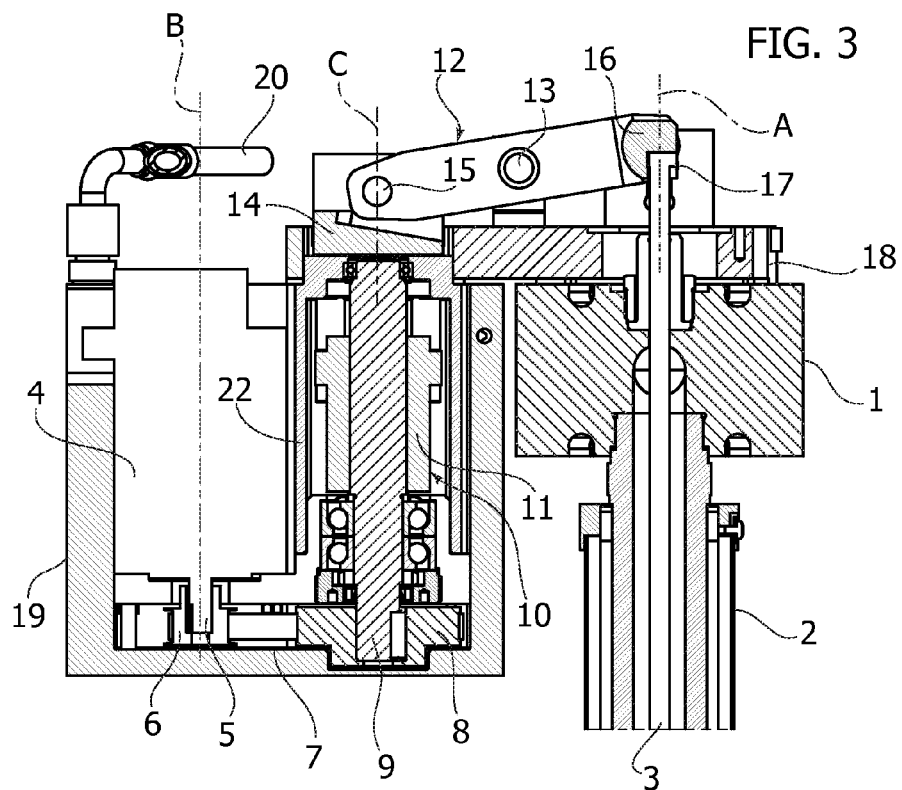
FIG. 3 is a partial view in vertical section of FIG. 1.
Figure 4:
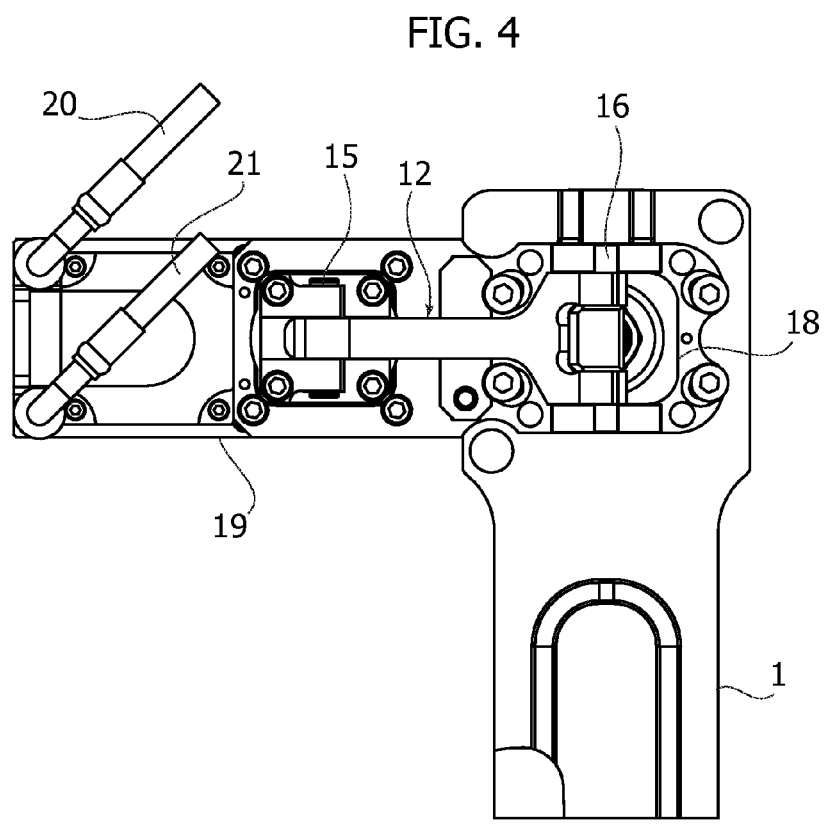
FIG. 4 is a top plan view of FIG. 1.

Once again in a way in itself known, and as may be seen in FIGS. 2 and 3, the injector 2 is equipped with a valve pin 3 that can be displaced axially between an advanced or lowered closing position and a raised or retracted opening position to enable flow of the fluid plastic material from the hot runner 1 to the cavity of the mould. The axis of the valve pin 3, oriented vertically, is designated by A in FIG. 3.

Displacement of the valve pin 3 along the axis A is governed by a rotary electric motor 4, the shaft of which, designated by 5, is set according to an axis B, which is also vertical, i.e., parallel to the axis A of the valve pin 3.

Fitted on the shaft 5 facing towards the bottom of the electric motor 4 is a drive pulley 6 over which an endless belt 7 is run, which actuates a driven pulley 8 fitted on the bottom end of a wormscrew 9 of a screw-and-nut transmission assembly 10 of the ball-circulation type, the internal screw of which is designated by 11 and is able to slide vertically within a guide body 22.

The transmission formed by the pulleys 6, 8 with the belt 7 and by the screw-and-nut assembly 10 has an effect of multiplication of the force applied by the shaft 5 of the electric motor 4.

The screw-and-nut assembly 10 is set immediately alongside the electric motor 4 with its own axis, designated by C in FIG. 3, oriented vertically and hence parallel to the axes A and B.

The internal screw 11, moved in translation as a result of rotation of the screw 9 governed by the motor 4 via the pulleys 6 and 8 and the belt 7, in turn actuates—as has been said with a multiplying effect—a rocker 12 oscillating about a central horizontal axis 13 for governing translation of the valve pin 3. In greater detail, and as is more clearly represented in FIGS. 2 and 3, the internal screw 11 bears at the top a support 14, to which one end of the rocker 12 is articulated in 15, the opposite end of the rocker 12 carrying a pin 16, articulated to which is the top end of the valve pin 3. The opposite ends of the pin 16, projecting from the rocker 12, are guided within respective vertical slits 17 of a support 18 directly fixed to the hot runner 1.

In the case of the example represented, the arms of the rocker 12 are substantially equal. These arms could, however, have different lengths, for example so as to obtain a further system of multiplication of the force transmitted by the shaft 5 of the electric motor 4 to the plug 2.

Moreover fixed at the bottom, alongside the hot runner 1, to the support 18 is a casing 19 that extends alongside the injector 2 and projects at the bottom lower down than the hot runner 1, within which the electric motor 4 and the screw-and-nut assembly 10, as well as the belt transmission 6, 7, 8, are housed.

With the arrangement described, where, as has been said, the electric motor 4 and the screw-and-nut assembly 10 are both set laterally alongside the injector 2 with the respective axes B, C parallel to the axis A, the vertical encumbrance of the hot runner 1 and of the moulding apparatus as a whole is appreciably contained.

Control of the displacements of the valve pin 3 performed by the electric motor 4 through the transmission described above (the pulleys 6 and 8, the endless belt 7, the screw-and-nut assembly 10, and the rocker lever 12) may be obtained in different ways, typically through an electronic circuit coming under a transducer, for example of the encoder type (not illustrated in so far as it is conventional), operatively associated to the valve pin 3 or else to any one of the components of the transmission. As an alternative, or in addition, the end-of-travel positions of the valve pin 3, respectively, at the end of the step of opening and at the end of the step of closing, may also be determined by arrest means of a mechanical type, for example operatively associated to the arms of the rocker 12, i.e., to the support 14 to which the pin 15 is articulated and/or to the guides 17 along which the pin 16 moves.

Control of the electric motor 4 is conveniently obtained according to pre-defined settings, i.e., normally in a way not correlated to conditions of flow of the molten plastic material to be injected, which in this case do not need to be detected.

Figure 11:
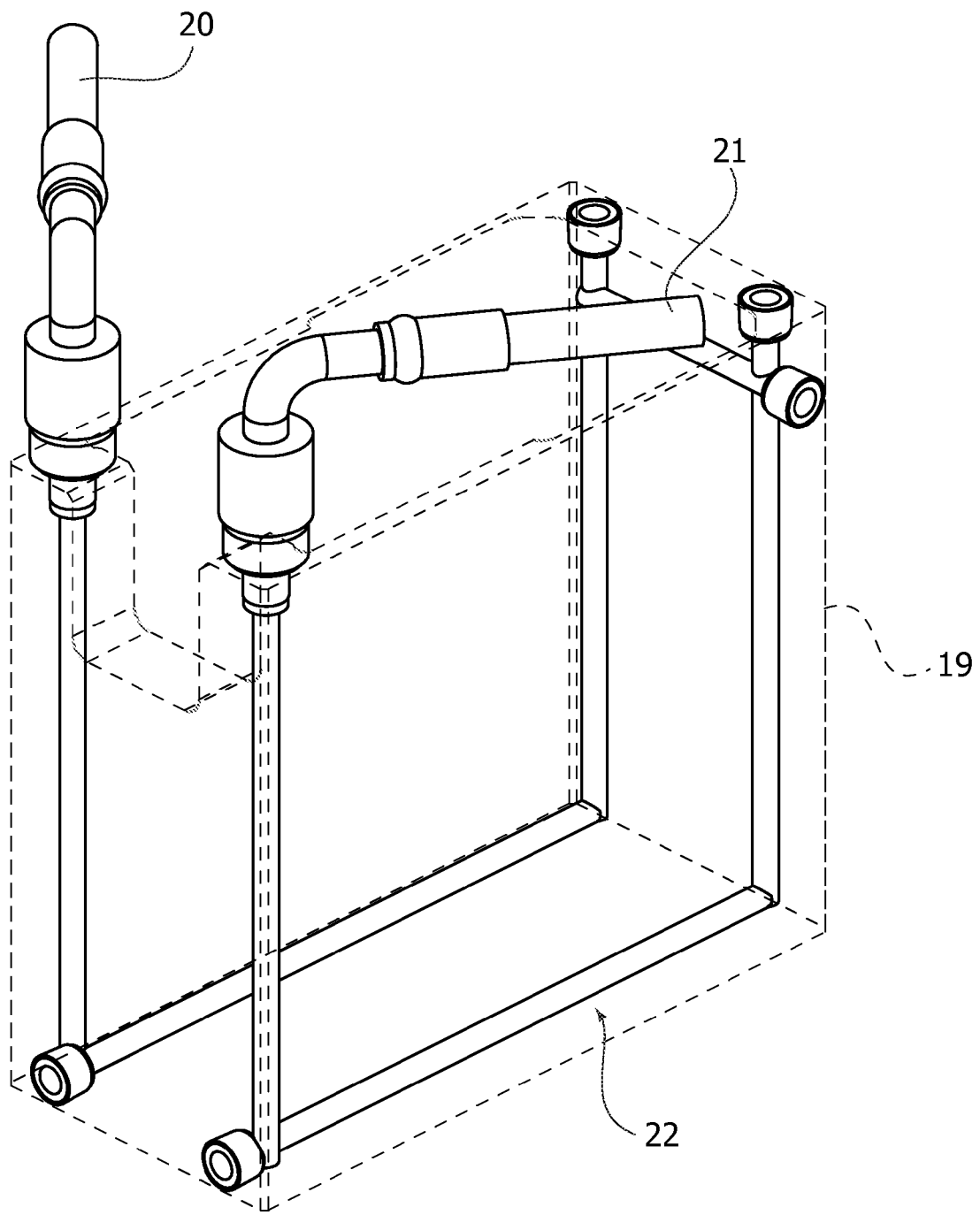
FIG. 11 is a schematic perspective view of a detail of FIGS. 3 and 10.

For cooling of the electric motor 4, as well as of the screw-and-nut assembly 10, there is provided a circuit for circulation of a coolant through an inlet connector 20 and an outlet connector 21 carried by the casing 19 and corresponding channels, designated as a whole by 22 in FIG. 11. The above circuit may be independent of that of the mould, and it is moreover possible to envisage two independent cooling circuits one for the motor 4 and one for the screw-and-nut assembly 10.

The cooling circuit may conveniently be equipped with a protection system coming under a sensor for detecting the flow-rate and/or temperature of the coolant and prearranged to interrupt operation of the apparatus, and in particular supply of the hot runner 1, in the case where the flow rate and/or the temperature detected are, respectively, lower or higher than predetermined threshold values. In this way, there is prevented the risk of overheating of the mechanical and electro-mechanical members (transmission, electric motor), which have to work at temperatures that are not too far above the ambient temperature and in any case much lower than those of the hot runner.

The connection between the support 18 and the hot runner 1 on one side, as well as between the support 18 and the casing 19 on the other, is advantageously obtained in such a way as to enable selective modification of positioning thereof in different angular configurations about the axis A of the valve pin 3 and about the axis C of the screw-and-nut assembly 10, respectively.

Figure 5:
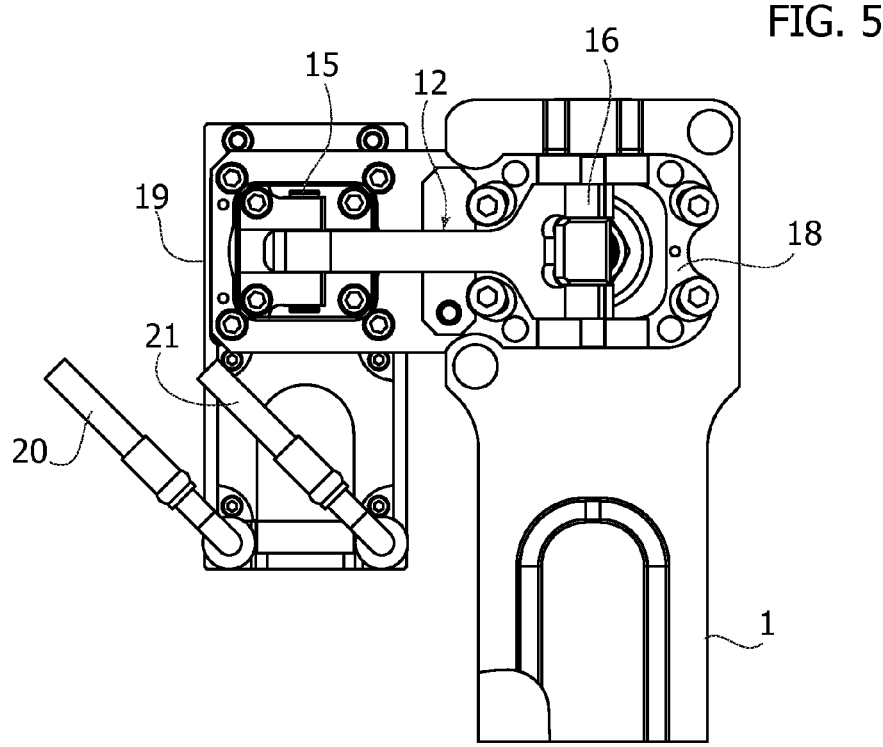
FIGS. 5, 6 and 7 are views similar to that of FIG. 4 of respective variants of the apparatus according to the invention.
Figure 6:
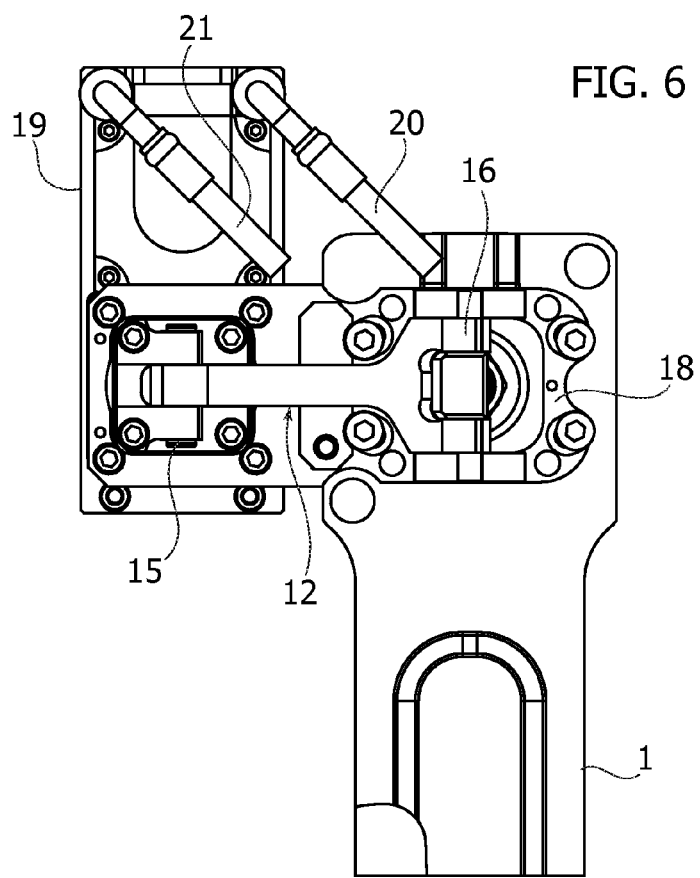
Figure 7:
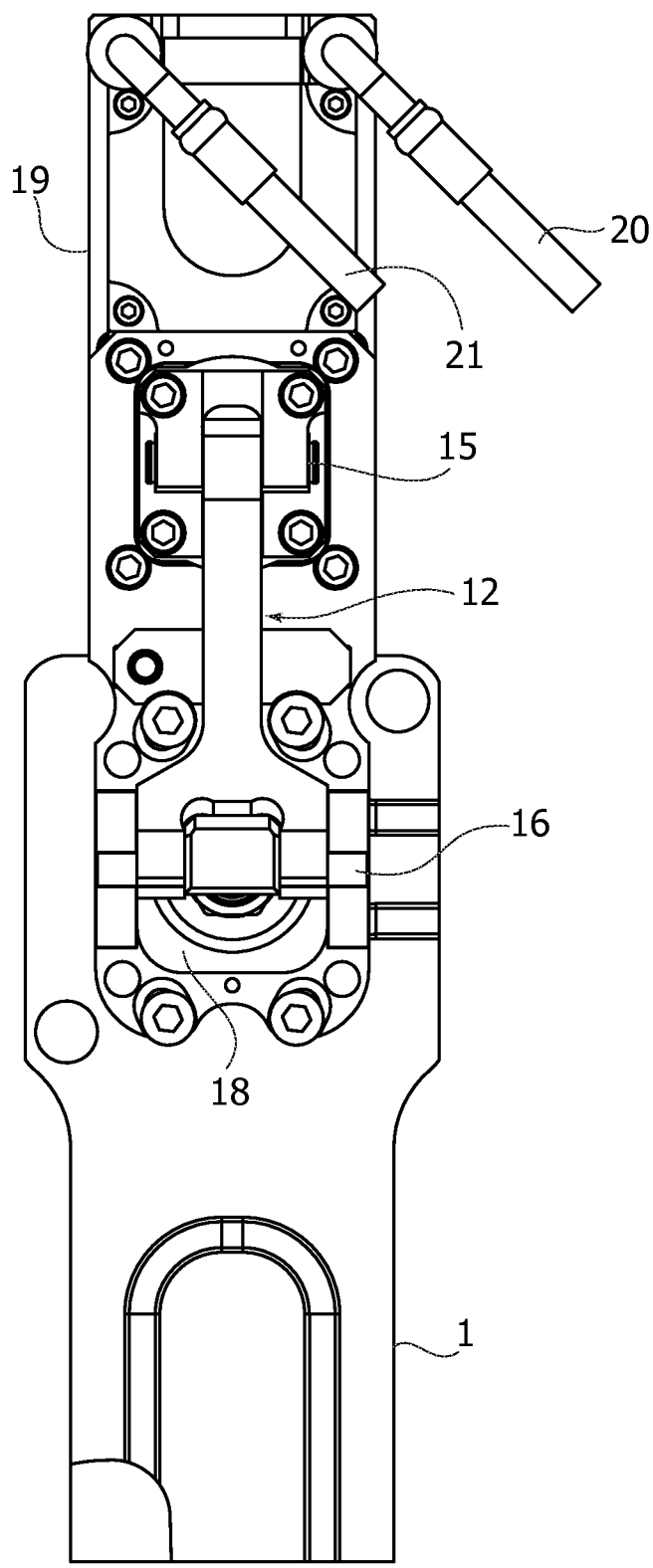

FIGS. 5, 6, and 7 exemplify some of the above alternative configurations: whereas in the case of FIGS. 1 to 4 the axes B and C are substantially coplanar to the axis A, so that the casing 19 projects perpendicular to the hot runner 1, in the case of FIG. 5 the vertical plane containing the axes B and C is orthogonal to the plane passing through the axes C and A, so that the casing 19 is set alongside parallel to the hot runner 1. In the case of FIG. 6, the arrangement is similar, except for the fact that the casing 19 is rotated through 180° with respect to the configuration represented in FIG. 5, whereas in the case of FIG. 7 the support 18, instead of being perpendicular to the hot runner 1, is set on its prolongation, with the axes A, B and C, which also in this case are coplanar.

Of course, there may be devised different configurations also with different angles, provided that the electric motor 4 and the screw-and-nut assembly 10 of the ball-circulation type are in any case set laterally with respect to the injector 2 and substantially within the vertical encumbrance of the hot runner 1. Thus, the axis B of the electric motor 4 and the axis C of the screw-and-nut assembly 10 could also be oriented at an angle (for example, of 45° or 90°) with respect to the axis A of the valve pin 3.

Figure 8:
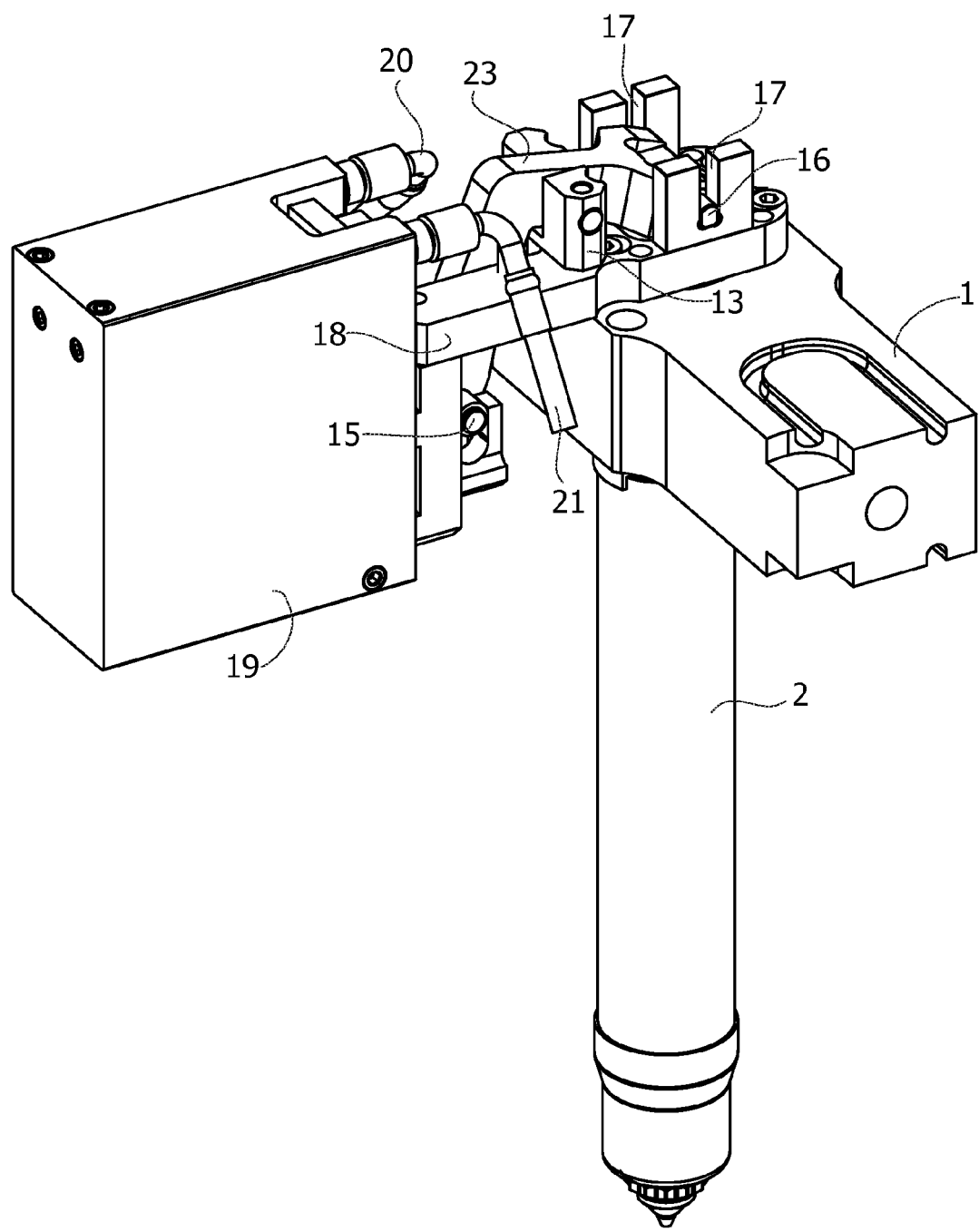
FIG. 8 is a schematic perspective view, similar to that of FIG. 1, of a further variant of the invention.
Figure 9:
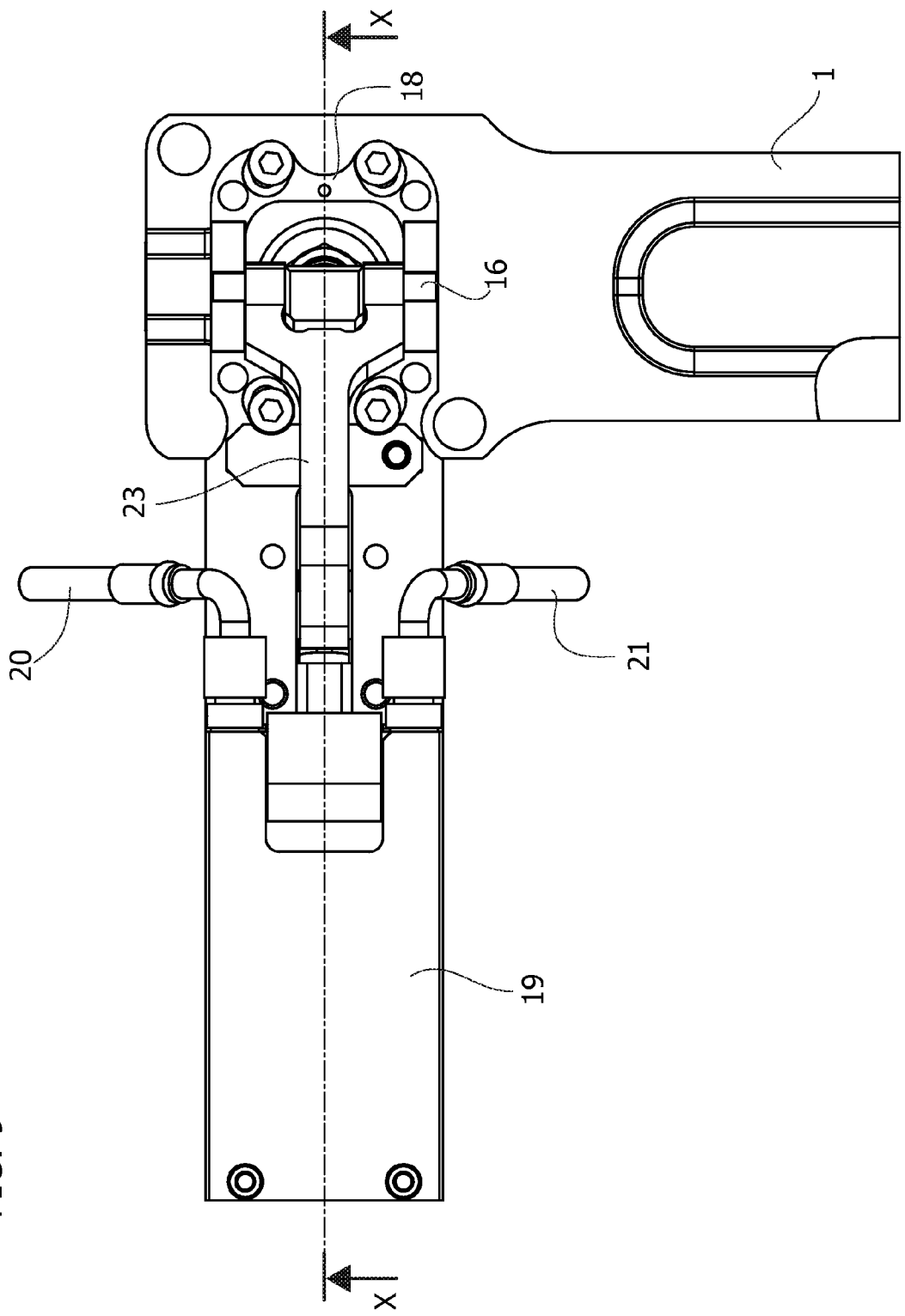
FIG. 9 is a top plan view of FIG. 8.
Figure 10:
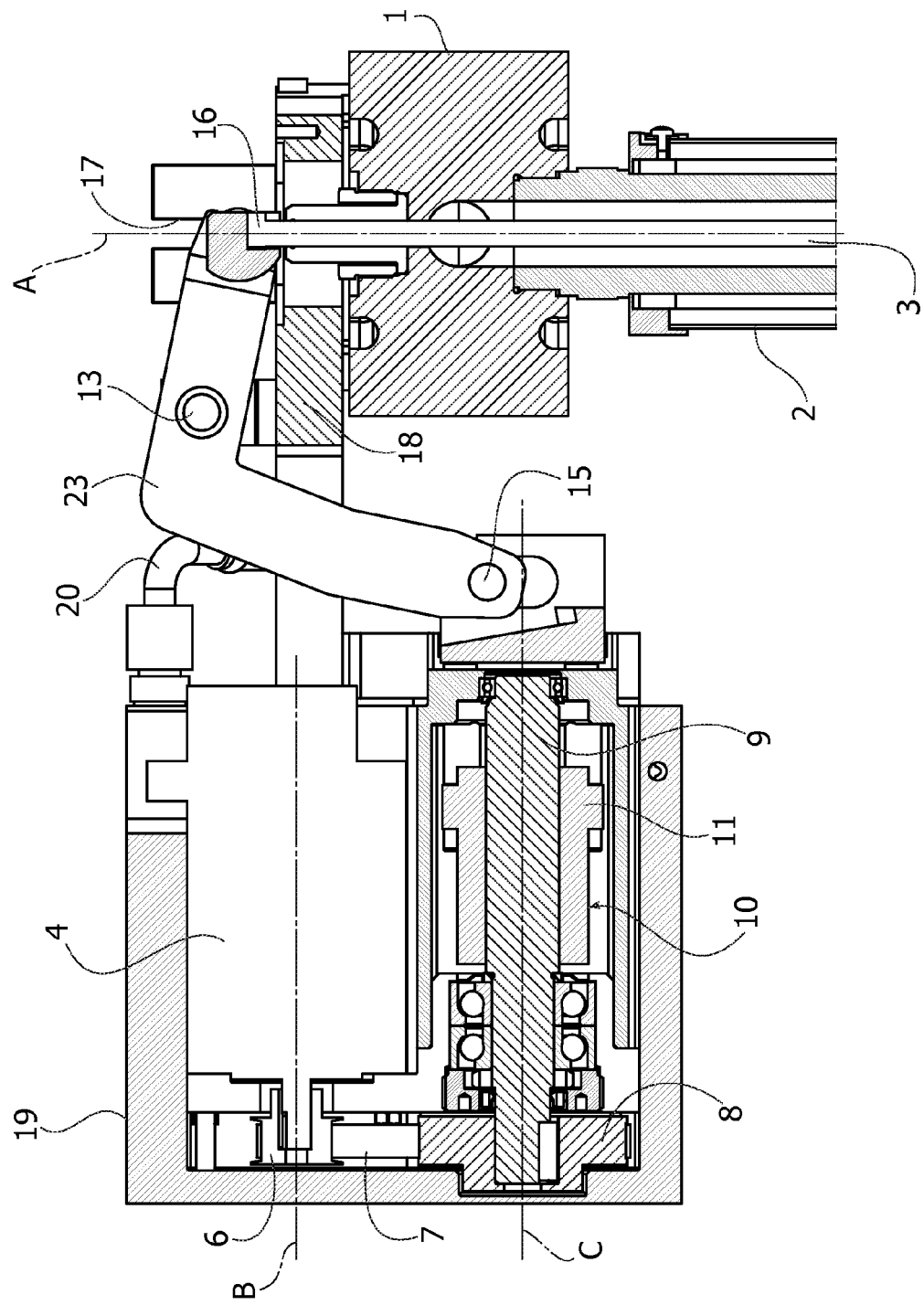
FIG. 10 is a cross-sectional view according to the line X-X of FIG. 9.

The variant represented in FIGS. 8-10, in which parts that are identical or similar to the ones already described previously are designated by the same reference numbers, illustrates a solution in which the electric motor 4 and the screw-and-nut assembly 10 of the ball-circulation type are set alongside and parallel to one another with the respective axes B and C oriented horizontally, i.e., perpendicular to the axis A of the plug 3. In this case, the rocker 12 is replaced by a substantially L-shaped oscillating lever 23, which performs the function of further multiplier of the force applied by the shaft 5 of the electric motor 4 on the plug 2.

As compared to the solutions described previously, in this case the casing 19 containing the electric motor 4, the belt transmission 6, 7, 8 and the screw-and-nut assembly 10 projects more laterally and less at the bottom than the hot runner 1, whereas the encumbrance in height remains substantially the same.

Figure 12:
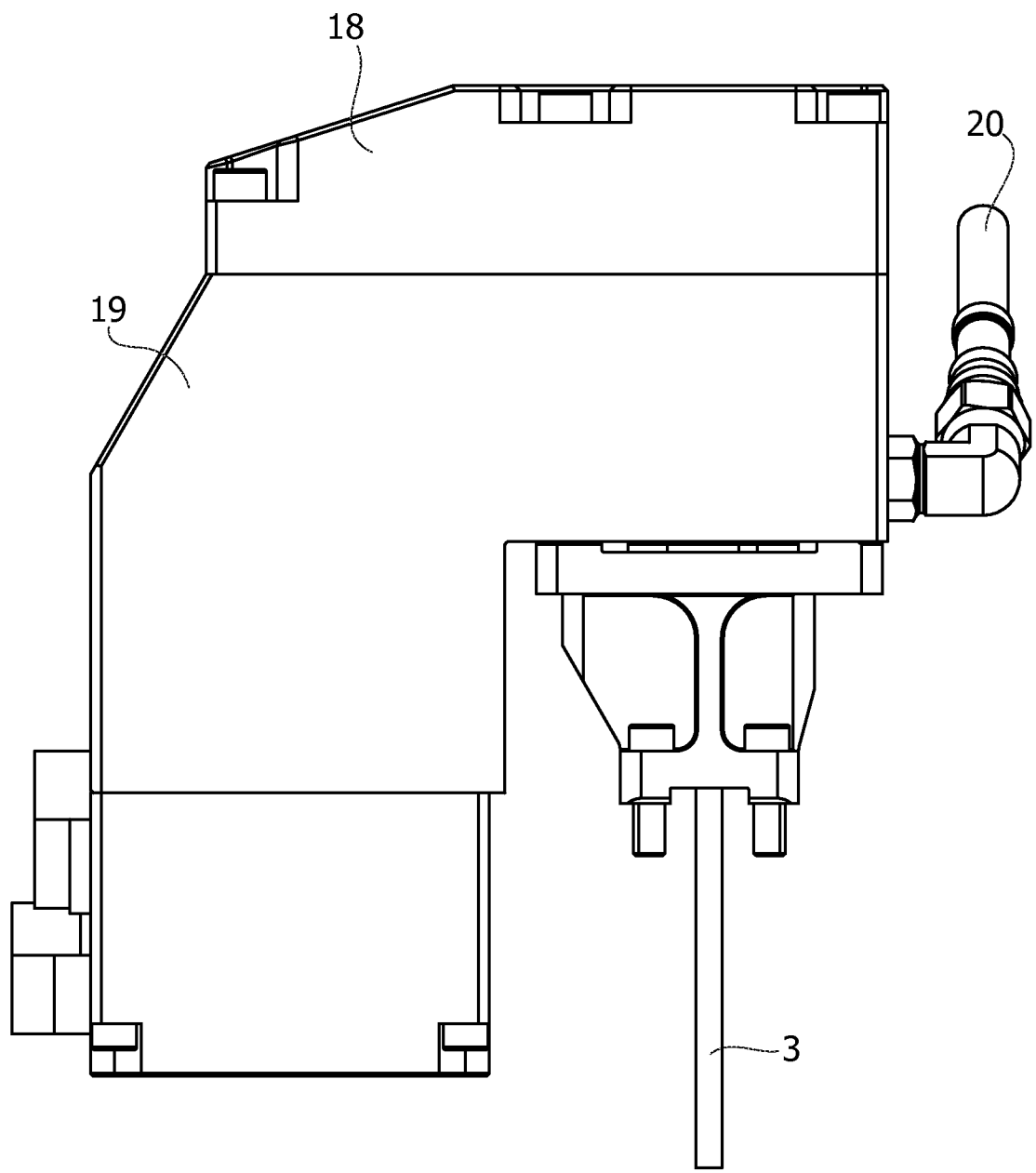
FIG. 12 is a schematic side elevation of another variant of the invention.
Figure 13:
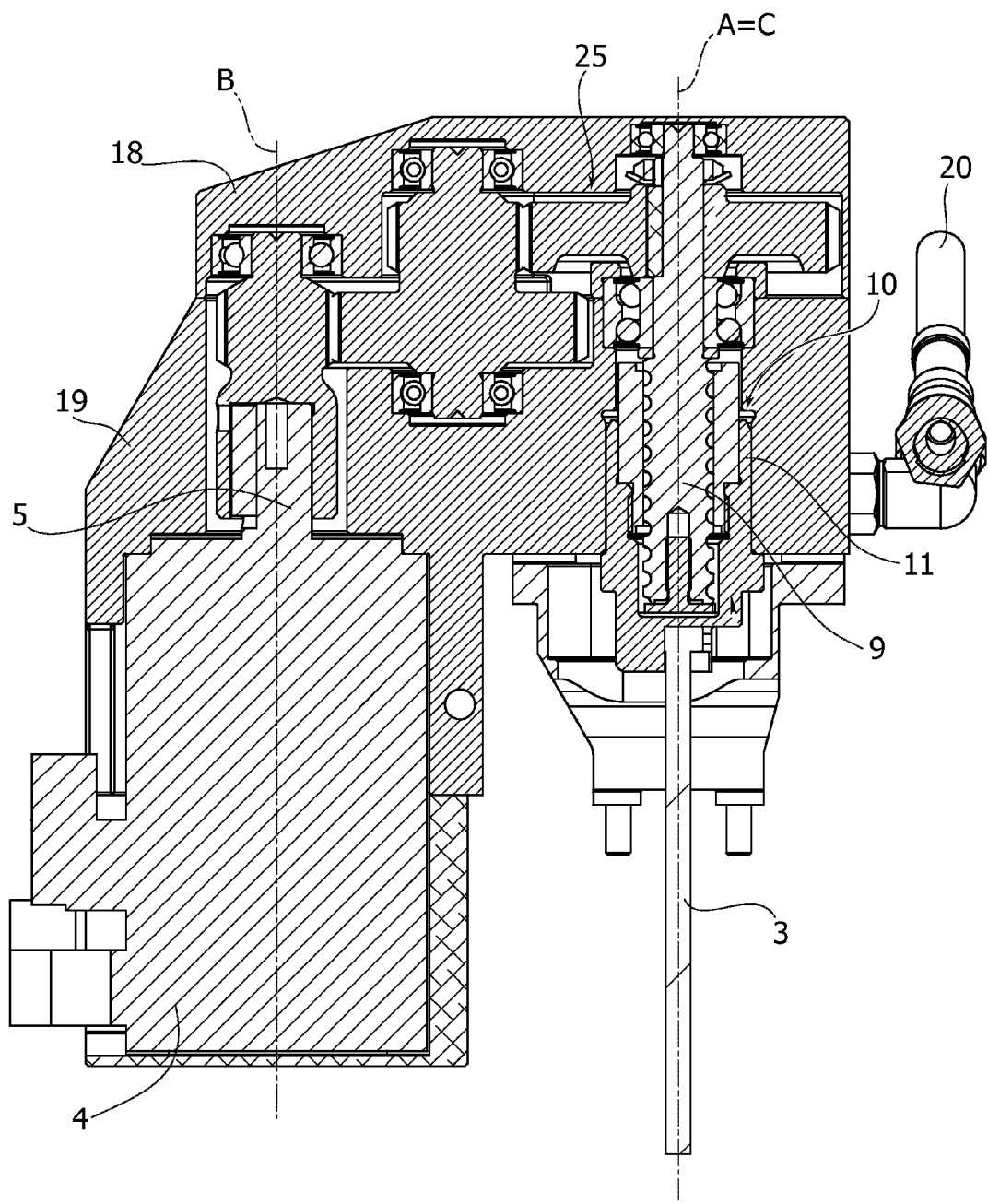
FIG. 13 is a vertical section of FIG. 12.
Figure 14:
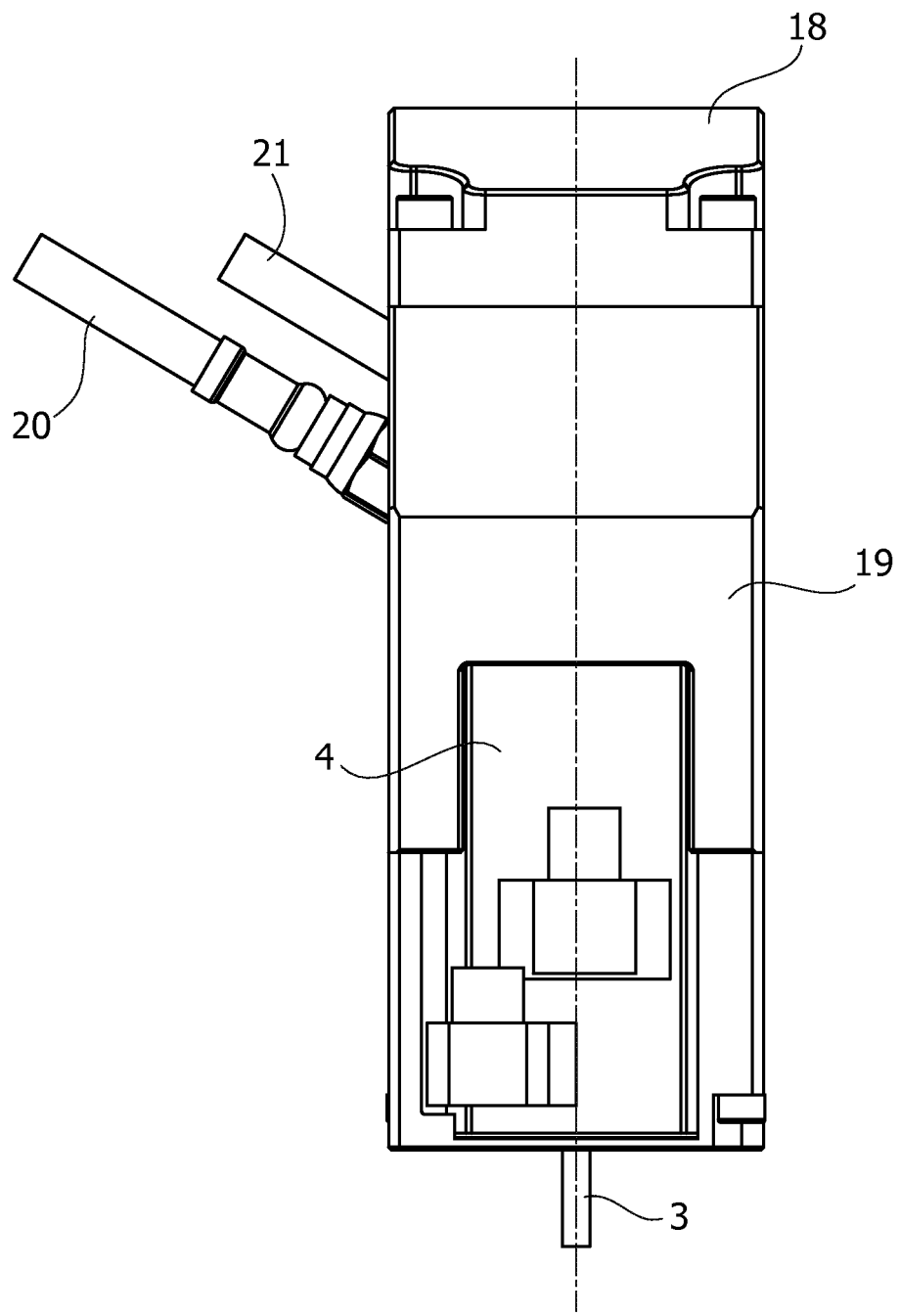
FIG. 14 is a dorsal view of FIG. 12.

In the variant represented in FIGS. 12 to 14, where also here parts that are identical or similar to those already described previously are designated by the same reference numbers, the electric motor 4 and the screw-and-nut assembly 10 of the ball-circulation type are also in this case set alongside and parallel to one another, with the respective axes B and C oriented vertically like the axis A of the plug 3. However, in this case the axes A and C coincide, in the sense that the screw 9 and the plug 3 are coaxial. The screw 9 is driven in rotation via a force multiplier formed in this case by a train of cylindrical gears 25 driven by the shaft 5 of the rotary electric motor 4. The internal screw 11 is coupled to the top end of the plug 3.

Also in the case of the variant illustrated in Figures and 16, currently considered as the preferred embodiment, the electric motor 4 and the screw-and-nut assembly 10 of the ball-circulation type are set alongside and parallel to one another and to the plug 3, with the respective axes A, B, and C oriented vertically.

Unlike the embodiment of FIGS. 1-4, the force-multiplier system between the shaft 5 of the motor 4 and the screw 9 of the screw-and-nut assembly 10 is formed by the train of cylindrical gears 25, and actuation of the plug 3 is performed by the internal screw 11, which translates along the ball screw 9 governed in rotation by the train 25, through the further force-multiplier system formed by an oscillating lever 27.

The oscillating lever 27 has one end 28 connected to the internal screw 11 and is articulated at the opposite end 29 to a fixed fulcrum 30. The top of the plug 3 is articulated to a slot 31 formed in an intermediate area of the oscillating lever 27. This arrangement enables further increase of the effect of force multiplication.

Also in this case, cooling of the rotary electric motor 4 and of the screw-and-nut assembly 10 is provided via a common circuit.

Figure 17:
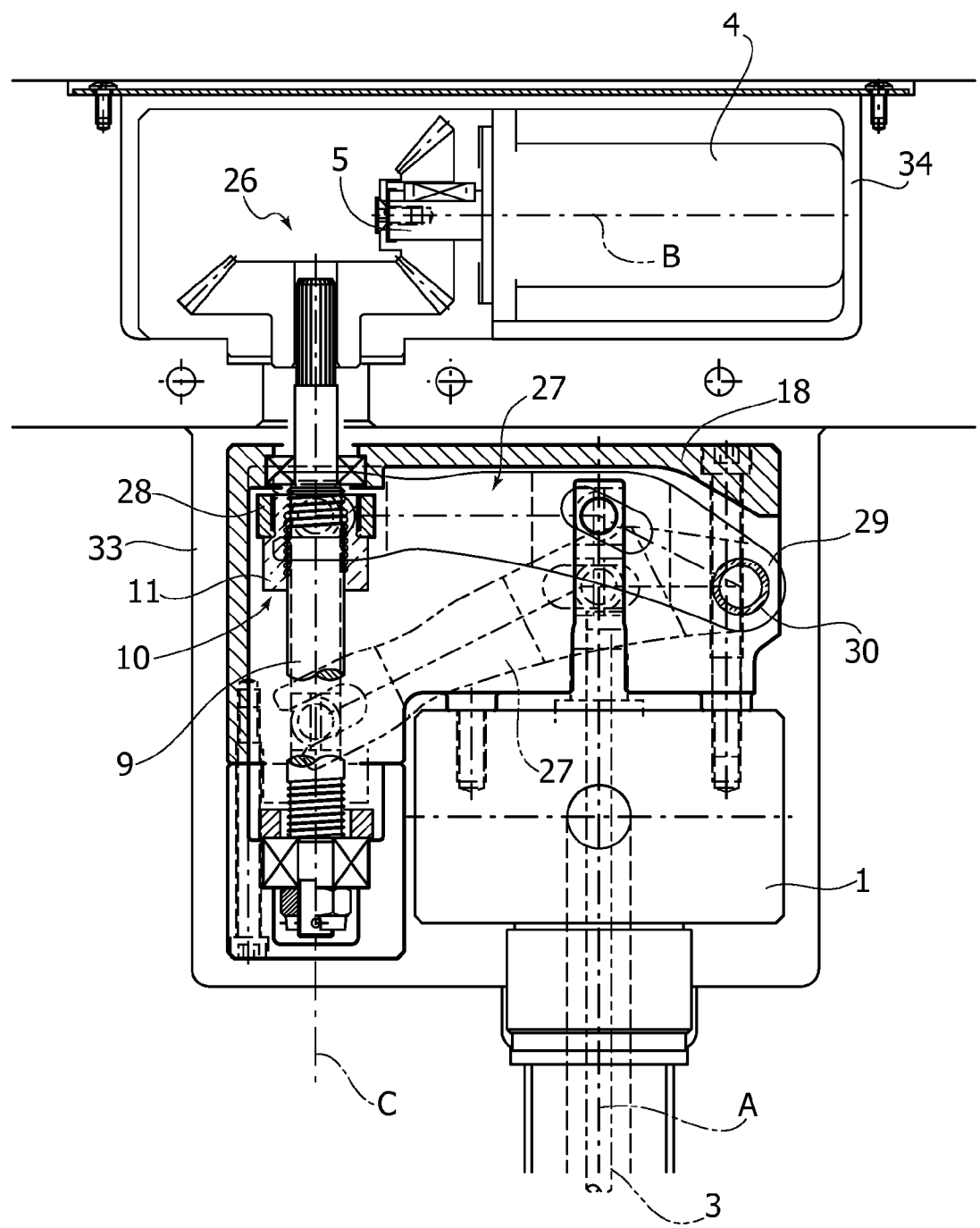
FIG. 17 is a view in vertical section of another variant of the invention.

Finally, in the embodiment represented in FIG. 17, the screw-and-nut assembly 10 of the ball-circulation type is set alongside and parallel to the plug 3 with the respective axes C and A oriented vertically, whereas the motor 4 is set at the top with its own axis B oriented horizontally, i.e., orthogonal to the axes A and C.

Figure 15:
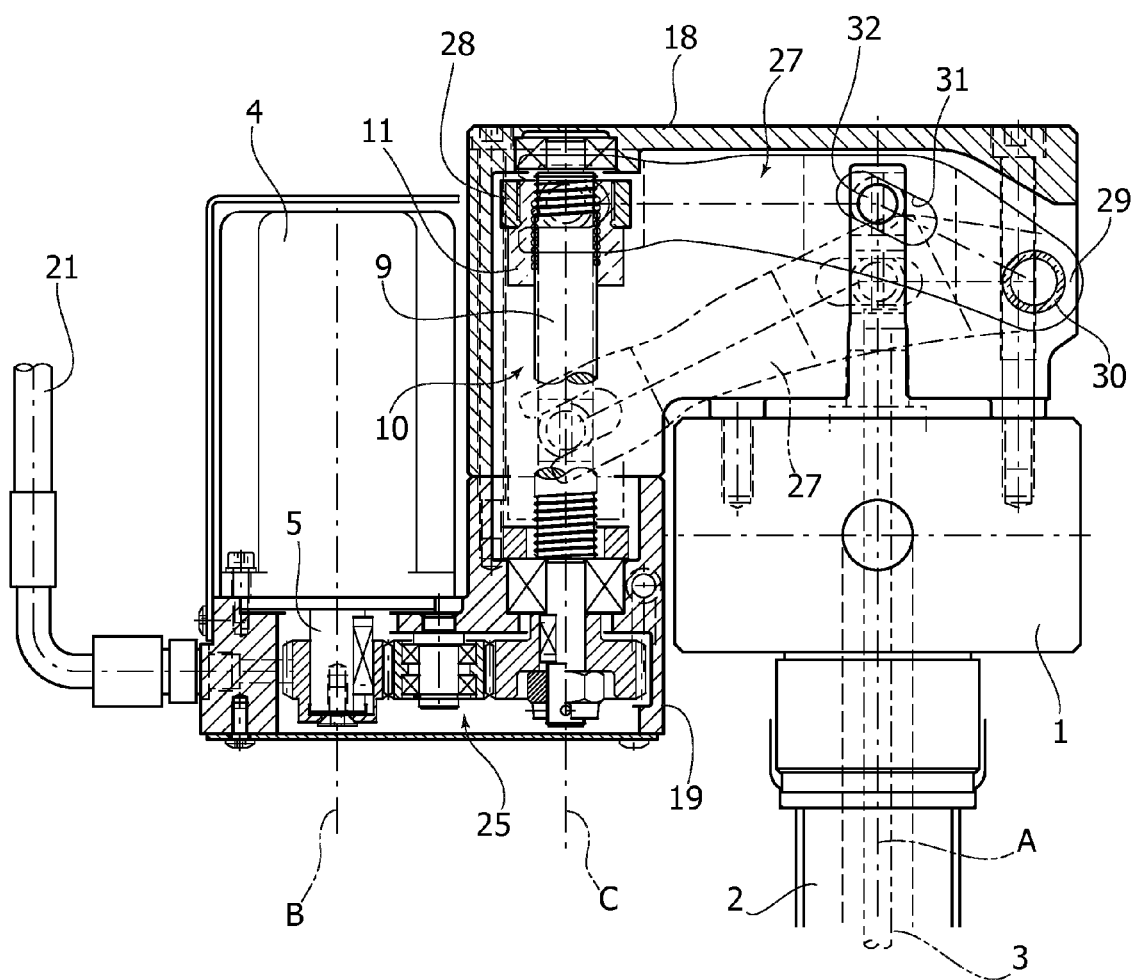
FIG. 15 is a view in vertical section of a further variant of the invention.
Figure 16:
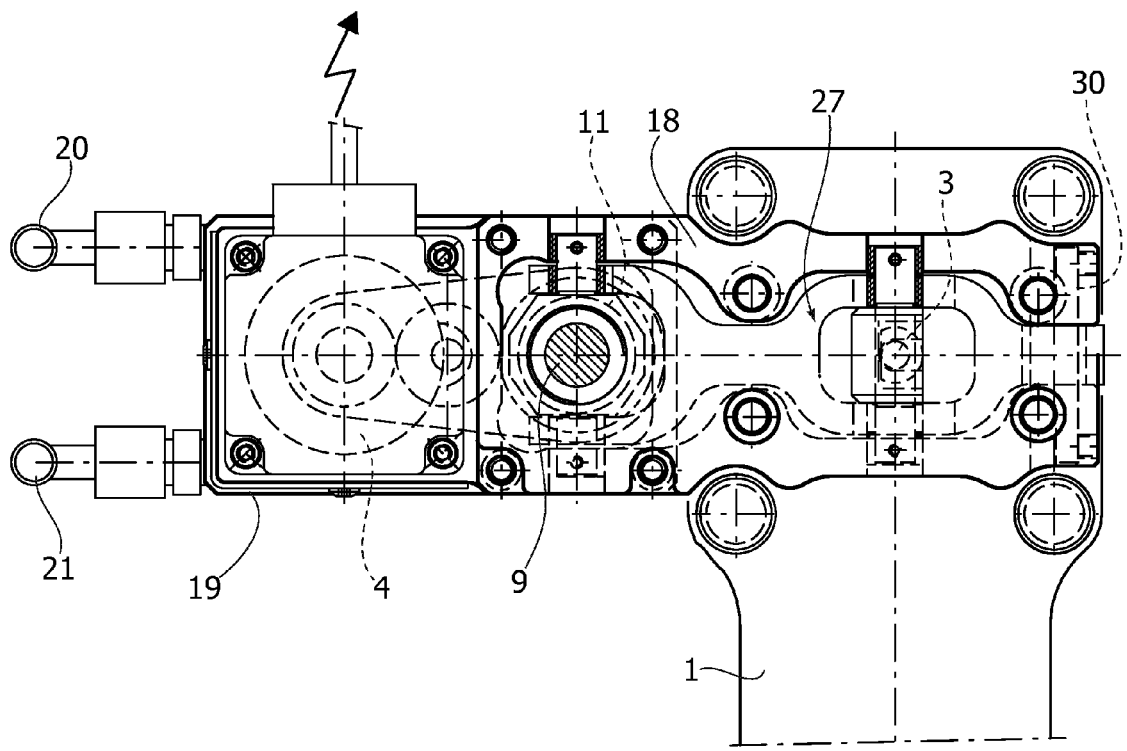
FIG. 16 is a view in partial horizontal section of FIG. 15.

In this case, the force multiplier between the shaft 5 of the motor 4 and the screw 9 of the screw-and-nut assembly 10 is formed by a pair of bevel gears 26, and the force multiplier between the internal screw 11 and the plug is constituted, as in the case of the embodiment of FIGS. 15 and 16, by the lever 27 oscillating about the fixed fulcrum 30.

This solution presents the advantage of enabling convenient dismantling of the motor 4 with the crown wheel and pinion 26, which are mounted independently within a recess 34 of the closing plate of the mould, from the screw of the screw-and-nut assembly 10, which is mounted, together with the other components of the transmission, on the hot runner 1 through a plate 33. The electrical connections of the motor 4 can thus be kept within the closing plate of the mould, which reduces the risk of damage due to the heat of the hot runner, at the same time guaranteeing easier assembly and more convenient maintenance.

Of course, the details of construction and the embodiments may vary widely with respect to what has been described and illustrated herein, without thereby departing from the scope of the present invention as defined in the ensuing claims.

The invention claimed is:

1. An apparatus for injection-moulding of plastic materials comprising a hot runner, at least one injector including a nozzle, within which a valve pin is axially movable, and actuator means for governing axial displacement of the valve pin between a closing position and an opening position to enable flow of fluid plastic material under pressure from the hot runner into a mould cavity, wherein the actuator means include a rotary electric motor and a transmission including a screw-and-nut assembly for converting the rotation of the shaft of the rotary electric motor into a translation of the valve pin, wherein said rotary electric motor and said screw-and-nut assembly are set parallel alongside one another.

2. The apparatus according to claim 1, wherein the valve pin defines a first axis, the shaft of the electric motor defines a second axis, and the screw-and-nut assembly defines a third axis, and wherein the second and third axes are parallel to one another and to the first axis.

3. The apparatus according to claim 1, wherein the valve pin defines a first axis, the shaft of the electric motor defines a second axis, and the screw-and-nut assembly defines a third axis, and wherein the second and third axes are parallel to one another and orthogonal to the first axis.

4. The apparatus according to claim 1, wherein the valve pin defines a first axis, the shaft of the electric motor defines a second axis, and the screw-and-nut assembly defines a third axis, and wherein the first and third axes are parallel to one another and orthogonal to the second axis.

5. The apparatus according to claim 2, wherein the first and third axes are coincident.

6. The apparatus according to claim 1, wherein said transmission comprises force-multiplier means set between the shaft of the electric motor and the screw of the screw-and-nut assembly.

7. The apparatus according to claim 6, wherein said force-multiplier means include an endless belt running over a pair of pulleys, a drive pulley and a driven pulley coupled in rotation, respectively, to the shaft of the electric motor and to the screw of the screw-and-nut assembly.

8. The apparatus according to claim 6, wherein said force-multiplier means include a train of cylindrical gears that couple in rotation the shaft of the electric motor and the screw of the screw-and-nut assembly.

9. The apparatus according to claim 6, wherein said force-multiplier means include a pair of bevel gears that couple in rotation the shaft of the electric motor and the screw of the screw-and-nut assembly.

10. The apparatus according to claim 6, wherein it includes further force-multiplier means set between the screw-and-nut assembly and the valve pin.

11. The apparatus claim 10, wherein said further force-multiplier means include a rocker lever driven by the screw of the screw-and-nut assembly for governing the valve pin.

12. The apparatus according to claim 11, wherein said rocker lever is articulated at one end to said screw and at the opposite end to the valve pin through linear guide means.

13. The apparatus according to claim 12, wherein said linear guide means define end-of-travel arrests for the valve pin.

14. The apparatus claim 10, wherein said further force-multiplier means include an oscillating lever having one end connected to said screw and articulated at the opposite end to a fixed axis, an intermediate area of said oscillating lever being articulated to the valve pin.

15. The apparatus according to claim 1, further including transducer means for detection of the travel of said valve pin and control of said rotary electric motor.

16. The apparatus according to claim 1, wherein said rotary electric motor and said transmission are carried by a support directly fixed to the hot runner.

17. The apparatus according to claim 16, wherein said support is configured to be fixed to the hot runner in different selectable angular positions about an axis of the valve pin.

18. The apparatus according to claim 16, wherein said rotary electric motor and said screw-and-nut assembly are housed within a common casing that can be fixed to said support in different selectable angular positions about an axis of the screw-and-nut assembly.

19. The apparatus according to claim 18, wherein said casing includes channels for circulation of a coolant for the rotary electric motor and for the screw-and-nut assembly.

20. The apparatus according to claim 19, wherein said channels are in common for the rotary electric motor and for the screw-and-nut assembly.

21. The apparatus according to claim 19, wherein said channels are separate for the rotary electric motor and for the screw-and-nut assembly.

22. The apparatus according to claim 19, further including detector means for detecting the flow rate and/or the temperature of said coolant, which are operatively connected to a system for protection of the apparatus.

23. The apparatus according to claim 1, wherein said rotary electric motor and said screw-and-nut assembly are supported independently from each other.

\* \* \* \* \*